United States Patent
Thomire

(10) Patent No.: US 6,325,194 B1
(45) Date of Patent: Dec. 4, 2001

(54) HYDRAULIC CONTROL CLUTCH DEVICE EQUIPPED WITH A GUIDE TUBE AND METHOD FOR PRODUCING SUCH A TUBE

(75) Inventor: Sylvain Thomire, Levallois (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/485,889

(22) PCT Filed: Jul. 21, 1999

(86) PCT No.: PCT/FR99/01483

§ 371 Date: Feb. 18, 2000

§ 102(e) Date: Feb. 18, 2000

(87) PCT Pub. No.: WO99/66226

PCT Pub. Date: Dec. 23, 1999

(30) Foreign Application Priority Data

Jun. 19, 1998 (FR) .................................................. 98/07970

(51) Int. Cl.[7] ............................... F16D 25/08; B21C 23/18
(52) U.S. Cl. .................................... 192/91 A; 192/85 CA; 29/888.06; 72/348; 72/356; 72/359
(58) Field of Search .......................... 29/888.06; 72/327, 72/348, 356, 359; 192/91 A, 85 CA

(56) References Cited

U.S. PATENT DOCUMENTS

| | | | |
|---|---|---|---|
| 1,672,694 | * | 6/1928 | Shrum ................................. 72/327 |
| 4,395,811 | * | 8/1983 | Frye ................................... 72/348 X |
| 4,552,005 | * | 11/1985 | Matsushita ......................... 72/348 X |
| 5,547,058 | * | 8/1996 | Parzefall et al. ................. 192/85 CA |
| 5,761,949 | * | 6/1998 | Dalessandro et al. ............. 72/348 X |
| 5,944,157 | | 8/1999 | Blard et al. . |
| 6,202,819 | | 3/2001 | Giroire . |

FOREIGN PATENT DOCUMENTS

| | | |
|---|---|---|
| 44 34 594 A | 4/1996 | (DE) . |
| 195 23 011 A | 1/1997 | (DE) . |
| 197 16 219 A | 11/1997 | (DE) . |
| 2 531 164 A | 2/1984 | (FR) . |
| 2730532 | 8/1996 | (FR) . |
| 2745616 | 9/1997 | (FR) . |
| 2753505 | 3/1998 | (FR) . |
| 2 272 742 A | 5/1994 | (GB) . |
| WO 90 02274 A | 3/1990 | (WO) . |
| 9930057 | 6/1999 | (WO) . |

OTHER PUBLICATIONS

Patent Abstracts of Japan, vol. 012, No. 424 (M–761), Nov. 10, 1988 & JP 63 158330 A (Koyo Seiko Co Ltd), Inventor: Kusumoto Hirotaka, Application No. 61185856.

* cited by examiner

Primary Examiner—Richard M. Lorence
Assistant Examiner—Saúl Rodríguez
(74) Attorney, Agent, or Firm—Liniak, Berenato, Longacre & White

(57) ABSTRACT

A device comprising an outer body (6) integral with a guide tube (4) defining on its own a blind ring-shaped cavity (40) axially oriented wherein a piston (3) moves guided by the guide tube (4). The guide tube (4) is produced by impact extrusion. The invention is applicable to motor vehicles.

20 Claims, 11 Drawing Sheets

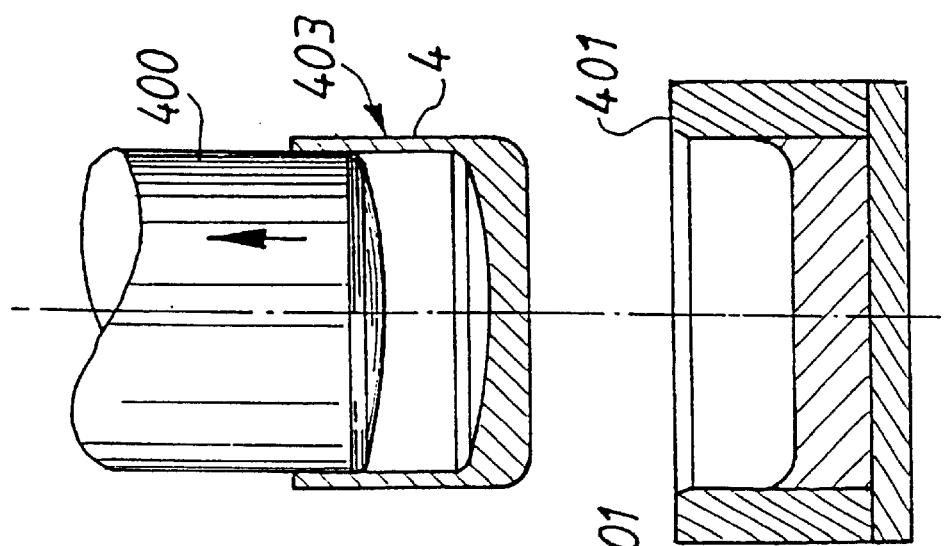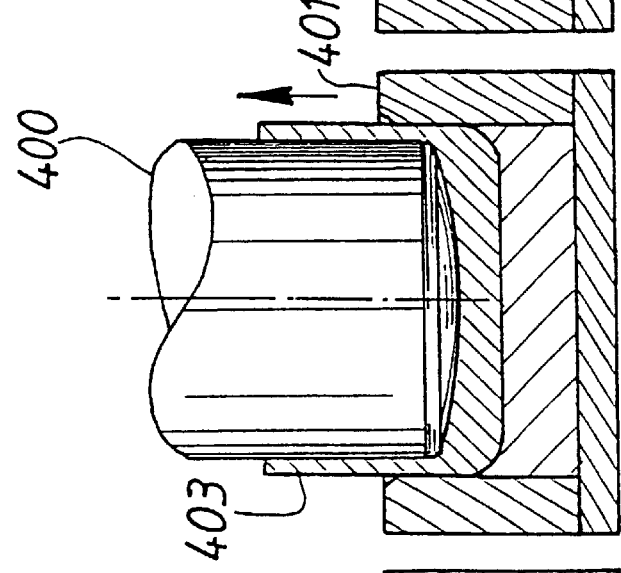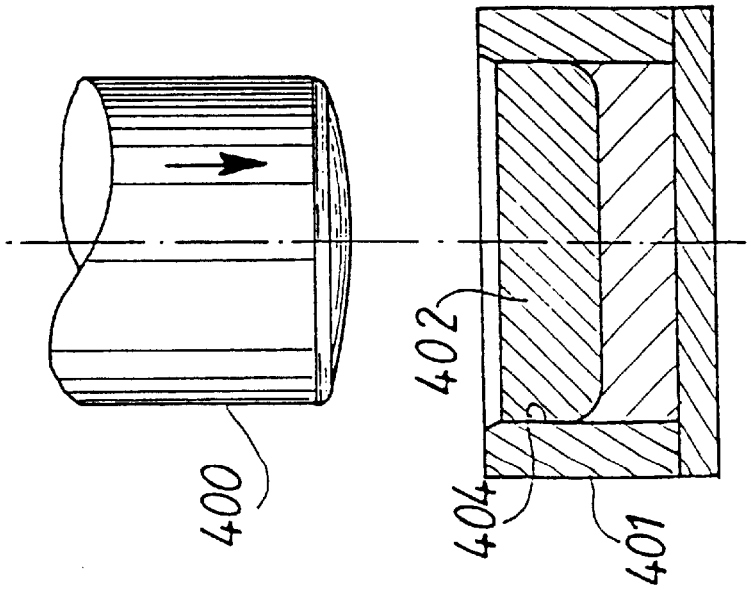

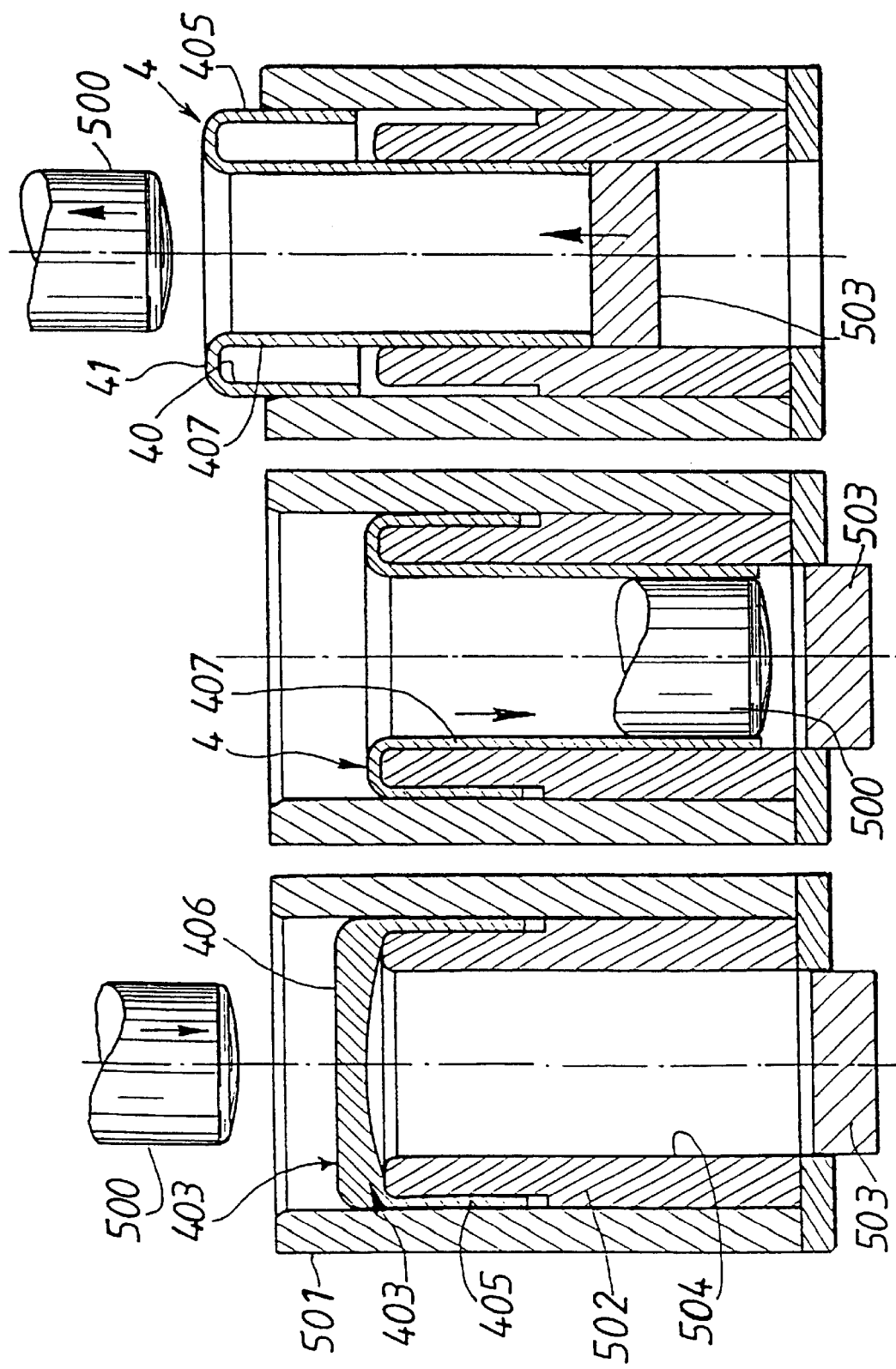

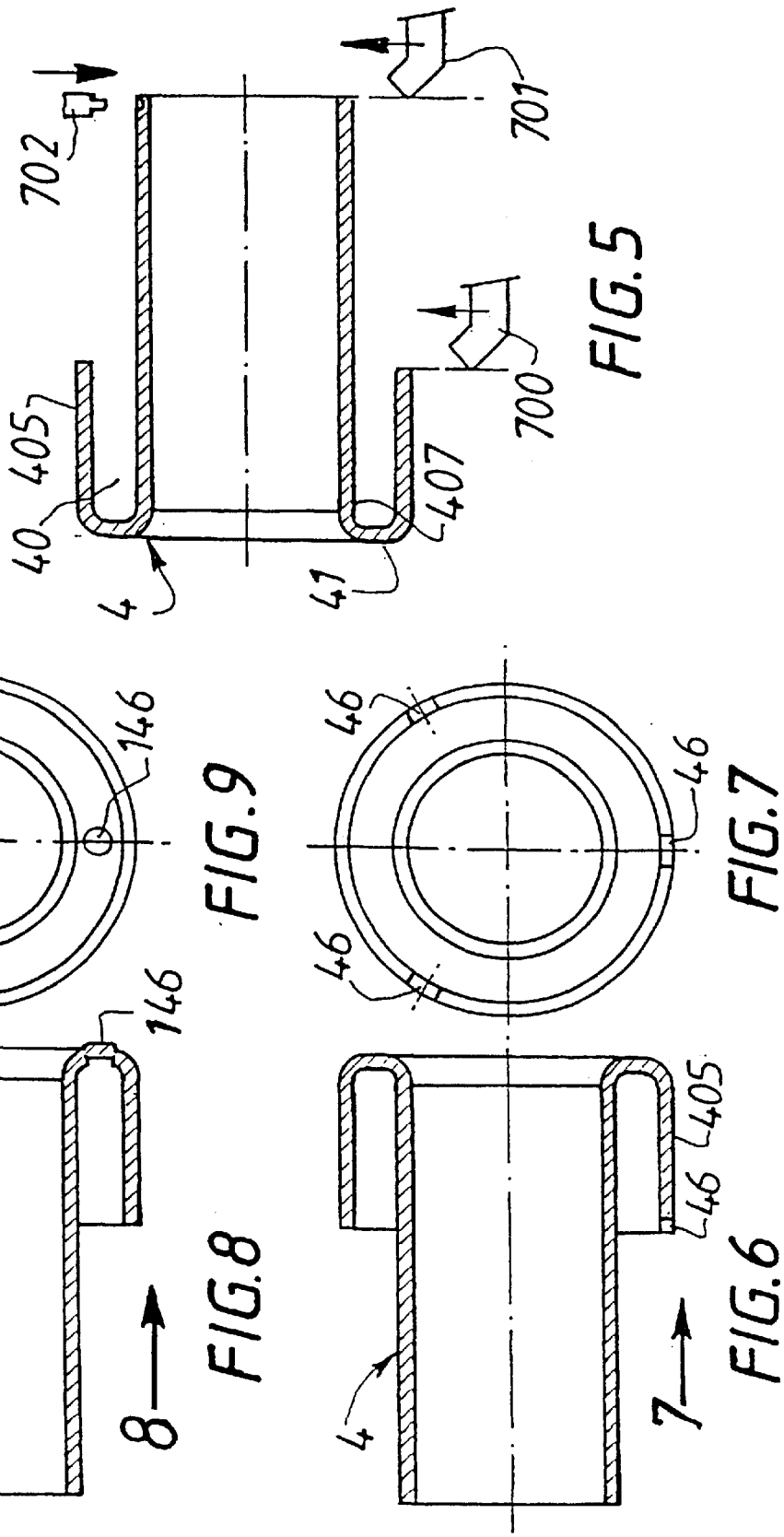

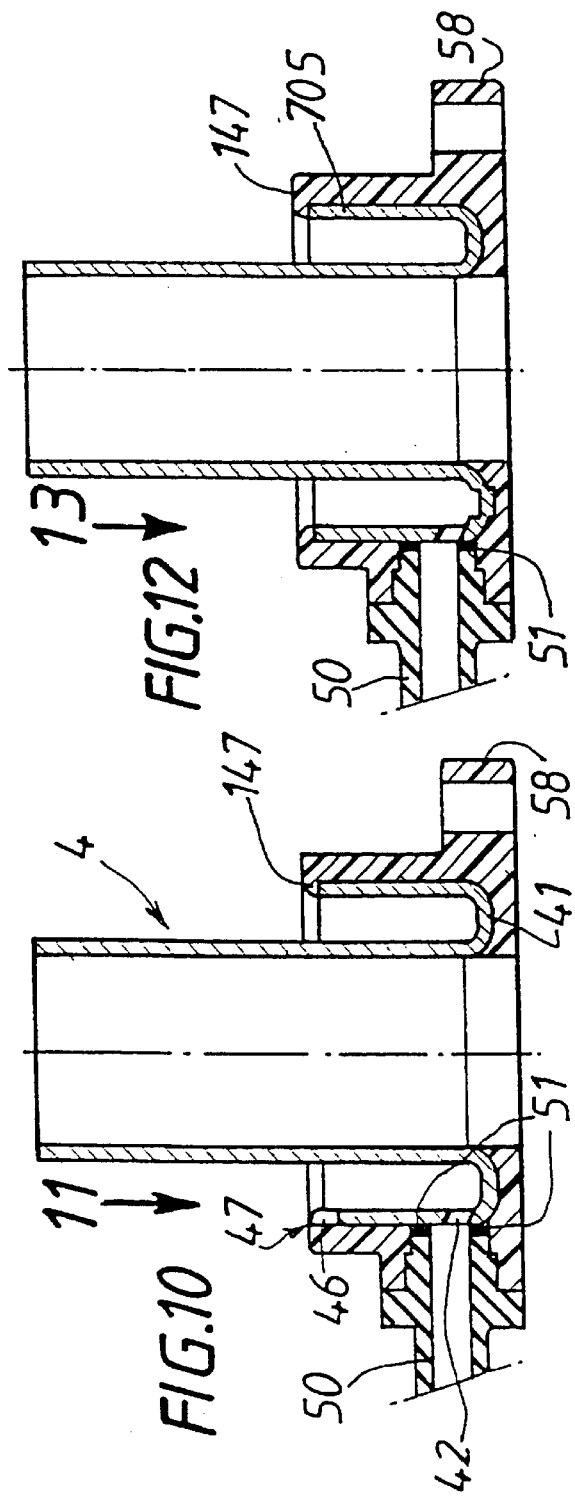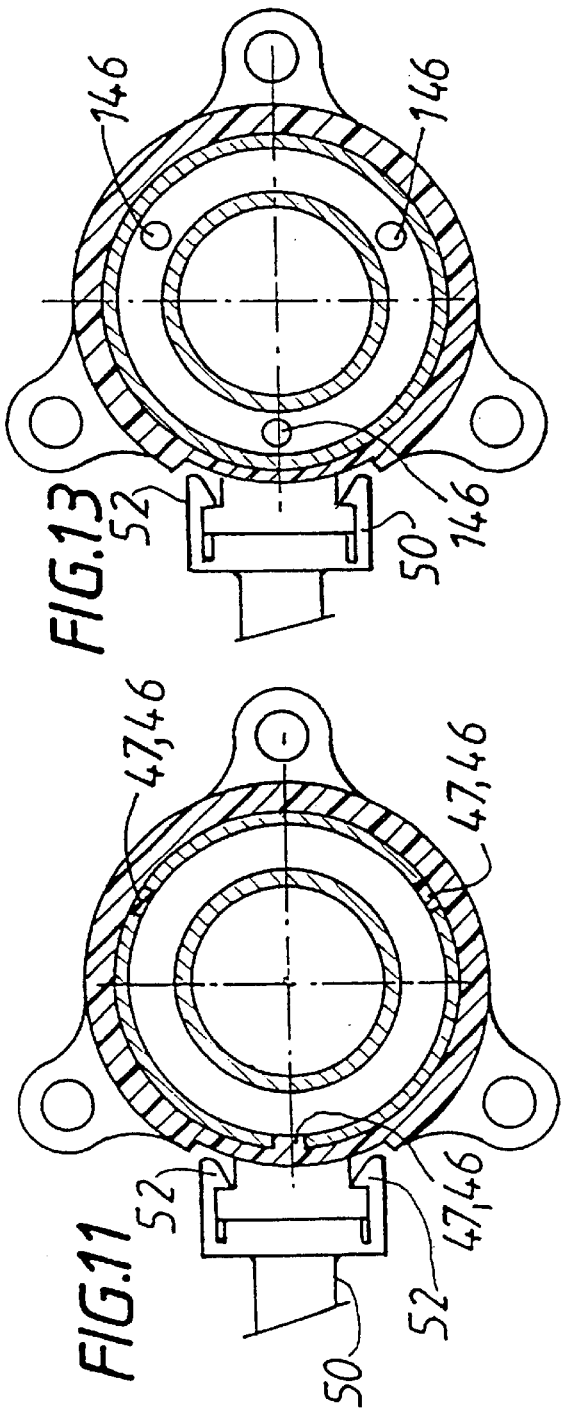

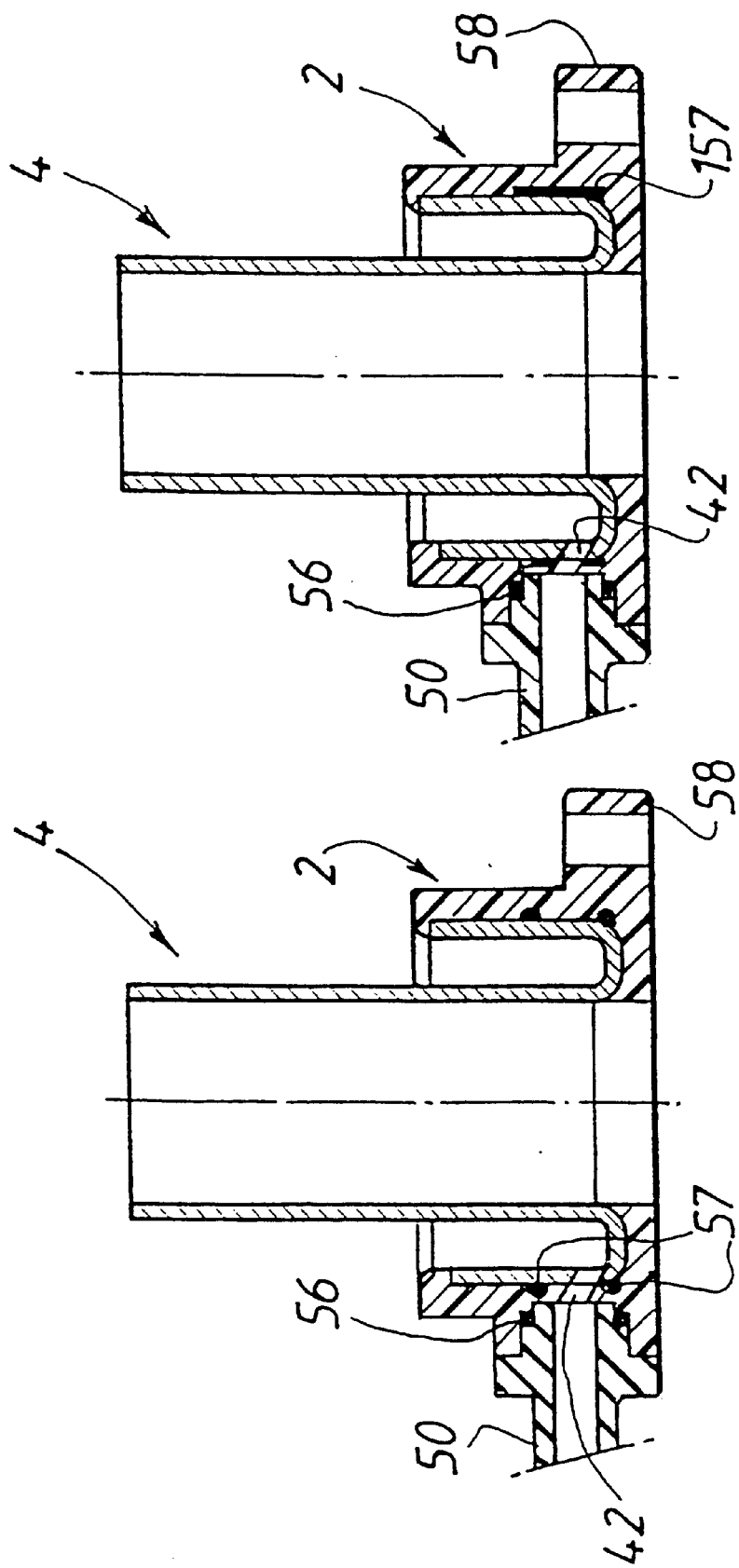

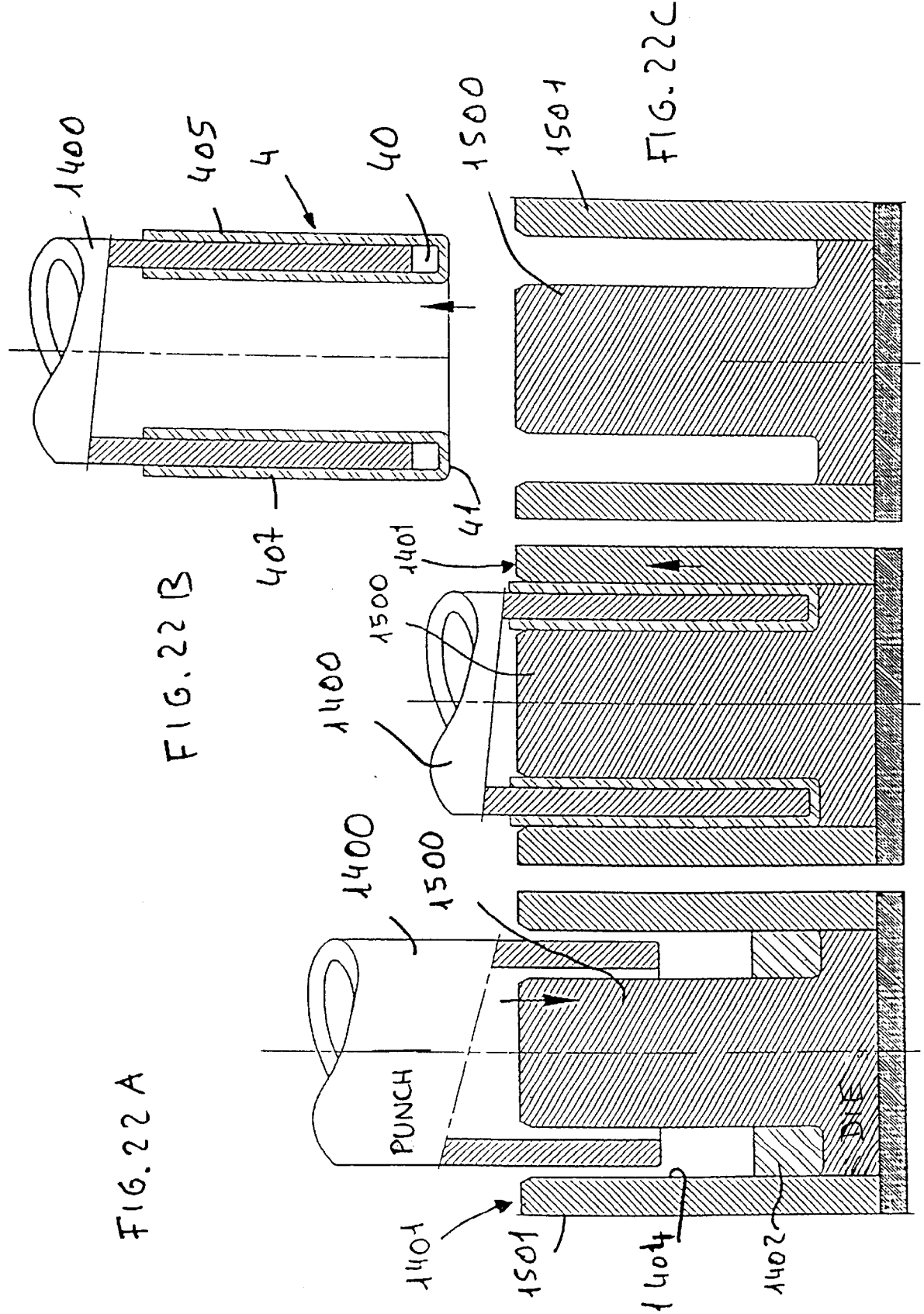

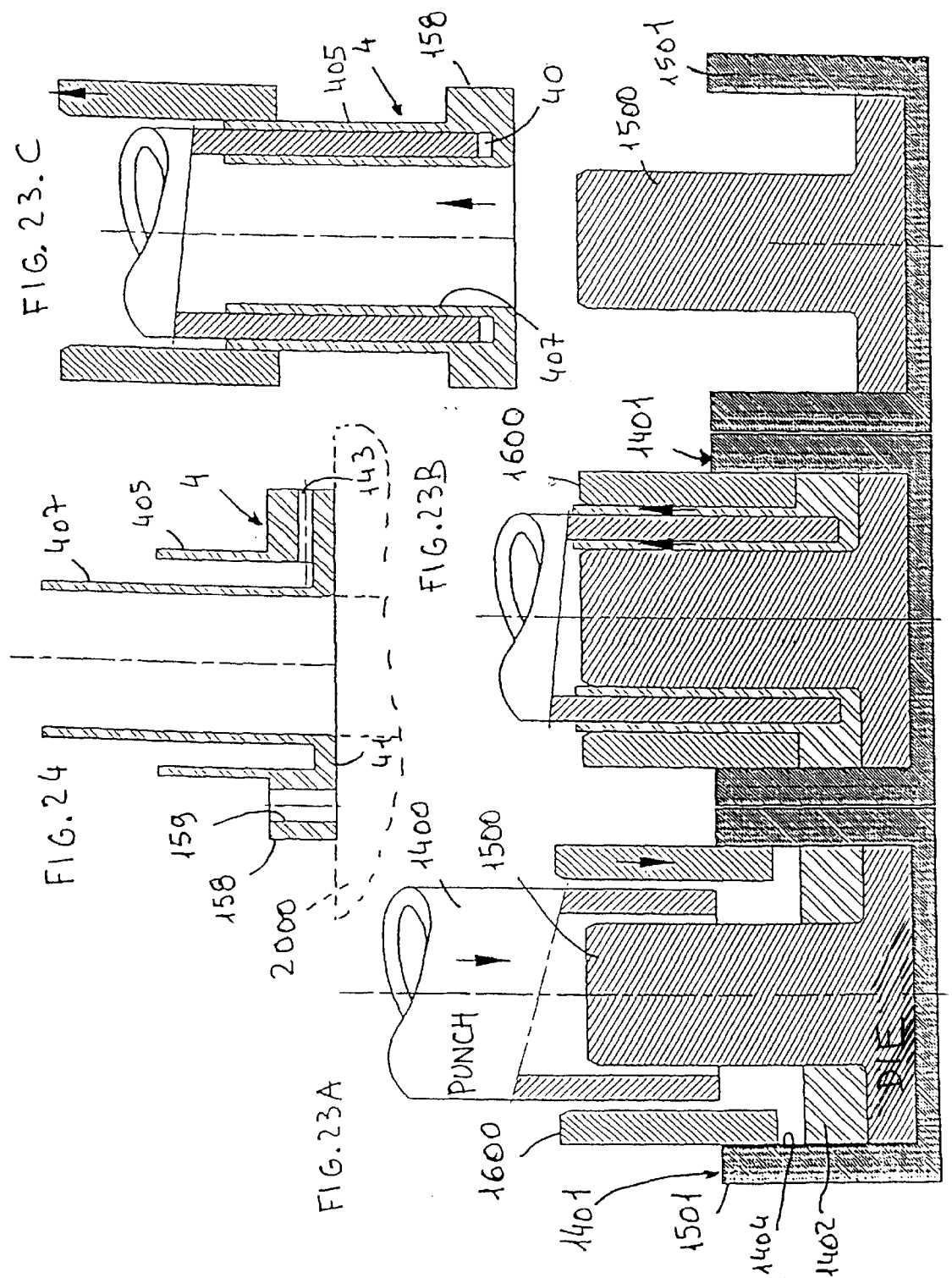

HYDRAULIC CONTROL CLUTCH DEVICE EQUIPPED WITH A GUIDE TUBE AND METHOD FOR PRODUCING SUCH A TUBE

BACKGROUND OF THE INVENTION

1. Field of the Invention

The present invention relates to a declutching device for a clutch, in particular for a mechanical diaphragm clutch for a motor vehicle.

More particularly, the invention relates to a hydraulically controlled declutching device comprising a clutch release bearing which is adapted to act on the declutching device of the clutch, such as a diaphragm, and carried by a piston which is mounted for axial movement, an axially oriented blind cavity defined between a part, referred to as the fixed part and comprising an external body and an internal tube guide which are mounted concentrically, wherein the piston slides axially along the tube guide and penetrates into the blind cavity so as to define with the piston a variable volume chamber.

The invention also relates to a method of making the tube guide.

2. Description of the Related Art A declutching device of this kind with hydraulic control through the piston is described in the document FR-A-2 730 532.

In the latter, the blind cavity is bounded by the tube guide, or guide tube, and by the external body.

The said tube has a plate portion at its rear end. The plate portion is gripped between the external body and the fixed part.

A seal is interposed between the plate portion of the tube guide and the external body, so as to seal the cavity. The axially oriented annular blind cavity is therefore difficult to standardise. In order to overcome this drawback in a simple and inexpensive way, recourse may be considered to a solution of the same type as that described in the document FR-A-2 531 164, that is to say delimiting the axially oriented blind annular cavity by the guide tube, which for this purpose has a base portion that joins an outer tube to an inner tube, which has the greater length.

This may be achieved by press-forming from sheet metal.

Such an arrangement is not entirely satisfactory because the coaxiality between the outer tube and the inner tube is not as good as is desired. In addition, the inner and outer faces of the inner and outer tubes respectively are not as smooth as desired.

SUMMARY OF THE INVENTION

An object of the present invention is to overcome these disadvantages in a simple and inexpensive way. It is therefore an object of the invention to provide good coaxiality between the outer and inner tubes.

Yet another object of the invention is to obtain good quality in the faces of the inner and outer tubes for guiding the piston. According to the invention, the guide tube is obtained by a method of impact drawing from a slug, which is preferably of an aluminium based material. In another version, the slug is of a magnesium based material or mild steel, or brass, or copper or any other malleable material. The method calls for at least one punch and a die for deforming the slug, which is solid, or which in another version has a central hole, in order to cause the metal of the latter to flow in a guided manner.

In this way, good coaxiality between the inner tube and the outer tube are obtained, the respective outer and inner faces of these tubes having a low roughness which enables the seal of the piston to be protected.

In general terms, a guide tube is obtained with good precision and with good geometrical quality without any repeat operation on the component.

It is possible easily to obtain a difference in thickness between the outer tube and the inner tube by adjusting the size of the punch and the die. The base of the cavity may have the desired form and the desired thickness, especially by deforming the slug to a greater or lesser extent with the aid of the punch and by profiling the die.

The base portion may then have a greater thickness than the inner and outer tubes. The external body may be separate from the guide tube. In another version, using the method according to the invention, the body is integral with the guide tube, which includes means for fastening it to the fixed part of the vehicle.

In a first embodiment, the drawing operation consists of a first operation, which produces a cylindrical cup, and then a second operation of deep drawing the base of the cup so as to obtain a tube guide with an axially oriented annular blind cavity delimited by concentric outer and inner tubes. In this case the slug is solid. In a second embodiment, the slug has a central hole so that the guide tube can be obtained in a single operation, with the die being then caused to penetrate into the hollow punch with the aid of a second punch which surrounds the first punch, and a collar portion can be formed for fastening on the guide tube. The declutching device is inexpensive. The guide tube may have an outer tube the length of which is smaller or the same as that of the inner tube.

Thus, thanks to the invention, the blind cavity can be standardised in a simple and inexpensive way.

In this connection it is enough to modify the external body according to each application, and in particular according to the form of the casing on which the external body is fixed.

The external body may be standardised and be mounted, by a bayonet type fitting, on a soleplate for adapting it to the casing. Such a mounting is described for example in the document FR-A-2 745 616, the contents of which are considered as being annexed to the present invention. It is thus possible to standardise both the tube guide and the body at the same time.

In general terms, thanks to the invention, the supplementary seal interposed in the prior art between the body and the plate element of the tube guide is omitted. The dangers of leaks are thus reduced.

The blind cavity is deformed less under the effect of variations of pressure that occur during the engaging and disengaging operations of the clutch, due to the fact that the said cavity is defined by a single member.

In this way improved guidance of the piston is obtained because the deformations of the inner tube of the tube-guide for guiding the piston are reduced. The declutching device according to the invention is thus more robust.

In addition, the seal which is included in the piston at its rear end, cooperates only with the tube guide according to the invention; that is to say with a single material, so that the choice of material for the seal is easier. This seal is more reliable. The useful life of the device is also increased and the dangers of leaks are reduced.

The external body is of a mouldable material, for example one based on aluminium, or plastics material, so that in all cases an inexpensive solution is obtained which is light in weight. The mounting of the body on the tube guide is easy.

The body is for example of plastics material formed by moulding on the tube guide.

In another version, the body is of plastics material and is mounted by snap-fitting on the tube guide.

The tube guide may be provided with recesses or projecting elements for preventing it form rotating with respect to the body. For example, during the applied moulding operation, the material of the body enters into the recesses or coats the projecting elements of the tube, such as press-formed elements. Because of the impact drawing process, the projecting elements or recesses, for example in the form of notches, are easily obtained.

Axial arrest of the tube guide is easily achieved, the material of the body matching the base of the tube guide and coming into engagement with the front end of the outer tube of the tube guide.

In all cases, with clipping or applied moulding, the body matches the form of the base portion and of the outer tube of the tube guide.

The body stiffens the tube guide even more, because it is in contact with a surface area of the tube which is larger than that in the prior art.

Deformations of the blind cavity are therefore further reduced. The feed duct to the cavity can be perforated before the body is mounted, for example by applied moulding, on the tube guide.

This operation also leads to perforation of the tube guide to put the cavity into communication with the blind cavity.

The body carries an inlet into which the feed duct extends. The inlet may be formed by moulding with the body, or it may be sealingly attached on the body, for example by welding with indirect application of heat, such as laser type welding, or by adhesion with ultrasonic welding.

It will be appreciated that, because of the drawing operation in accordance with the invention, a good surface condition is obtained for the tube guide, which in particular favours sliding of the piston and favours the sealing of the piston.

The piston seal undergoes more regular wear because the lips which it has only cooperate with a single type of material, due to the fact that the cavity is formed in the tube guide.

BRIEF DESCRIPTION OF THE DRAWINGS

The following description illustrates the invention with reference to the attached drawings, in which

FIGS. 3A to 3C show diagrammatically the indirect first impact drawing operation in the manufacture of the guide tube of the declutching device;

FIGS. 4A to 4C show diagrammatically the deep drawing, or direct impact drawing, operation in the manufacture of the guide tube;

FIG. 5 shows diagrammatically the second operation in which the concentric guide tube is sized to length;

FIG. 6 is a view in axial cross section of the guide tube equipped with rotational stop notches;

FIG. 7 is a view seen in the direction of the arrow 7 in FIG. 6;

FIGS. 8 and 9 are views similar to FIGS. 6 and 7, for another embodiment, with rotational stop notches;

FIGS. 10 and 11 are views identical to FIGS. 6 and 7 with the external body of the declutching device attached on the concentric guide tube;

FIGS. 12 and 13 are views identical to FIGS. 8 and 9, with the external body of the declutching device attached on the concentric guide tube;

FIGS. 14 and 15 are views in axial cross section, similar to FIGS. 10 and 11, showing still further versions as regards sealing;

FIGS. 22A to 22C are views similar to FIGS. 3A to 3C, for yet another embodiment;

FIGS. 23A to 23C are views similar to FIGS. 3A to 3C for a third embodiment of the method;

FIG. 24 is a view in axial cross section of the guide tube in FIGS. 23A to 23C.

DETAILED DESCRIPTION OF THE PREFERRED EMBODIMENTS

Figure 1:
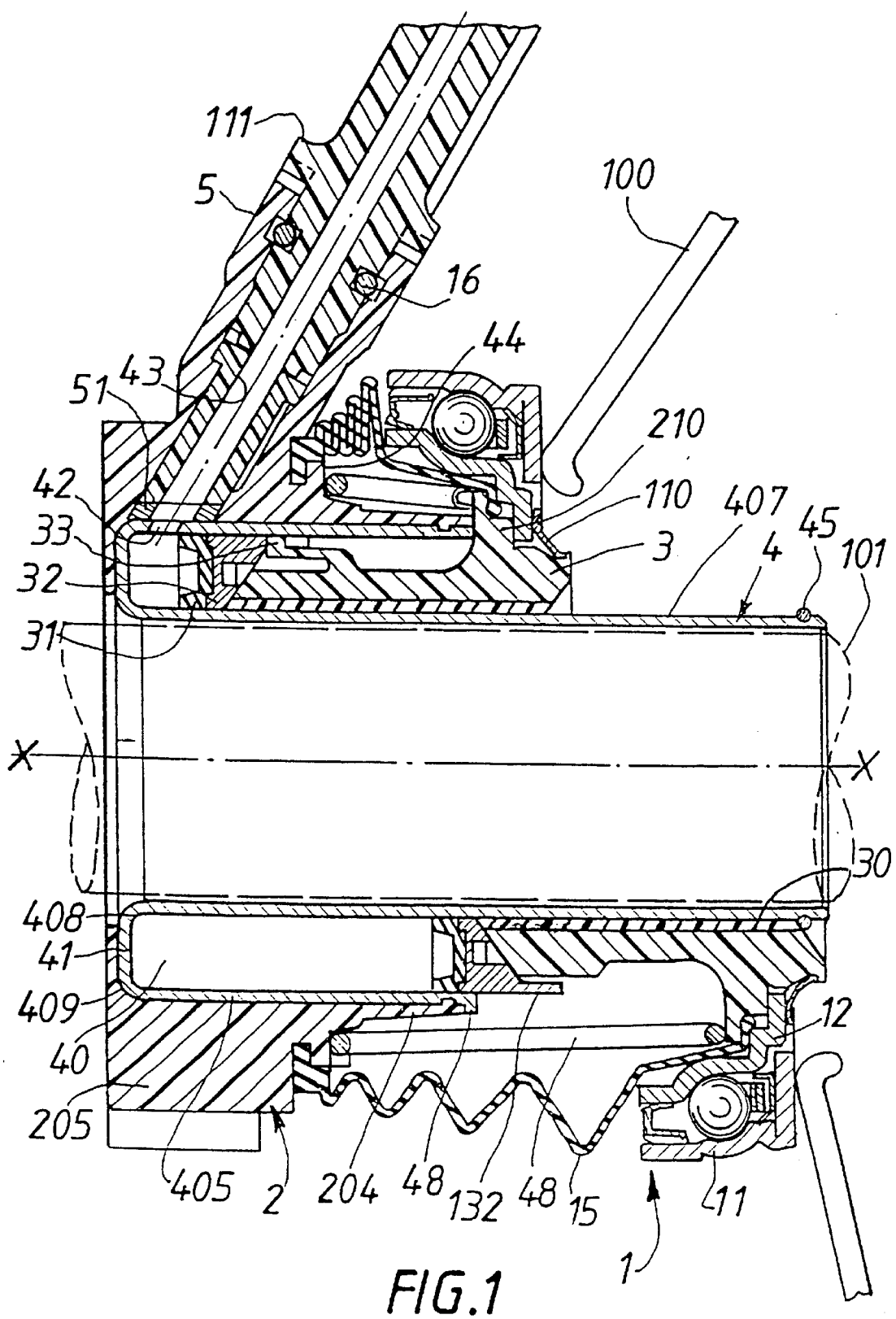
FIG. 1 is a view in axial cross section of the hydraulically controlled declutching device in accordance with the invention.

FIG. 1 shows a hydraulically controlled declutching device for a clutch which in this example is a mechanical diaphragm clutch for a motor vehicle, such as is described for example in the document FR-A-2 730 532.

The diaphragm 100 of the clutch accordingly constitutes the declutching device of the clutch, on which an actuating element 11 of the declutching device is arranged to act.

The actuating element 11 consists here of the rotating outer ring of a ball bearing. This ring is so configured in this case that it acts in a thrust mode on the inner end of the fingers of the diaphragm 100.

The inner ring 12 of the rolling bearing is fixed against rotation, balls being interposed between the rings 11, 12. The rings 11, 12 in this example are metal pressings.

It is of course possible to reverse the structures, with the outer ring of the rolling bearing being fixed against rotation while the inner ring of the bearing is then rotatable.

For more detail, reference should for example be made to the above mentioned document FR-A-2 730 532.

Thus, the rotating ring may be of bowed form or flat, so as to make point contact with the fingers of the diaphragm 100.

The assembly that consists of the rotating ring 11 and fixed ring 12 is conventionally called a clutch release bearing, 1, which in the present case is arranged to act in a thrust mode on the diaphragm 100.

This bearing 1 is acted on by a control member, which in this example is a piston 3 mounted for axial movement along a tube guide 4, also referred to as a guide tube. The bearing 1 is arranged to act on the declutching device 100 of the clutch and is carried by the piston 3.

More precisely, the hydraulic declutching device shown in FIG. 1 is a hydraulically controlled declutching device of the concentric type.

This hydraulic declutching device constitutes the hydraulic receiver of a hydraulic clutch control system. The control fluid may be liquid in nature, or may consist of compressed air. The method of control is referred to as hydraulic control in all cases.

The device accordingly has an inlet 5, of tubular form in this example, on which is connected, in the present case by clipping with an elastic spring clip 16, a pipe 111 connected to the output of a master cylinder (not shown), which is controlled by the clutch pedal, or, in another example, by an actuator including an electric motor coupled to a computer, which governs the electric motor in accordance with predetermined programmes in order to perform the declutching operation. The master cylinder comprises a piston and a variable volume hydraulic control chamber. The same is true for the receiver, that is to say the declutching device in accordance with the invention.

In the known way, when for example the driver acts on the clutch pedal, the piston of the master cylinder is displaced axially so as to expel the control fluid towards the receiver and to pressurise the hydraulic control chamber of the receiver. In this case, the volume of this chamber increases, and the clutch release bearing 1 is, with the piston 3, displaced towards the right in FIG. 1 as can be seen in the lower part of FIG. 1. In this case the diaphragm pivots and relaxes its action on the pressure plate of the clutch, thereby releasing the friction disc of the clutch.

When the driver releases his action on the clutch pedal, the piston of the master cylinder returns to its initial position, and the same is true of the piston 3 of the receiver, as can be seen in the upper part of FIG. 1.

The control chamber is then depressurised, with return being effected under the action of the diaphragm 100 which pushes the clutch release bearing 1 and the piston 3 towards the left in FIG. 1. The clutch is then engaged.

A preloading spring 48 is arranged to hold the rotating ring 11 in permanent engagement on the diaphragm.

The spring 48 works axially between the body 2 and the piston 3. This spring 48 is compressed when the clutch is engaged (FIG. 1, upper part), and is extended when the clutch is disengaged (FIG. 1, lower part). It will be recalled that when the clutch is engaged, a torque is transmitted from the engine of the vehicle to the input shaft 101 of the gearbox. When the clutch is disengaged, no torque is transmitted, given that the friction disc of the clutch is mounted in rotation on the shaft 101, and is arranged to be gripped between the pressure and reaction plates of the clutch under the action of the diaphragm. All of this is well known, and is described for example in the document FR-A-2 730 532. The clutch mechanism may of course include declutching levers acting on coil springs. It may consist of a false diaphragm acting on a Belleville ring.

In this document, the control fluid is oil, but in another version it may consist of compressed air, and it is therefore for simplicity that the declutching device according to the invention will be referred to as a hydraulically controlled declutching device.

This device is of the concentric type because it is arranged for a shaft to pass through it, in this example the shaft 101 of the gearbox which is indicated in broken lines in FIG. 1.

The device accordingly has an axial axis of symmetry X—X, with the guide tube 4 surrounding the input shaft 101.

As mentioned above, the device has a variable volume hydraulic control chamber which is bounded by the piston 3, movable axially along the tube guide 4.

The chamber is also bounded by an axially oriented annular blind cavity 40 which is arranged to be supplied with fluid under pressure from the tubular inlet 5, which is open into the cavity 40 in the region of the base portion 41 of the latter. The cavity 40 accordingly serves as a receptacle for the control fluid and for the piston 3, and more precisely for the seal 31 of the latter. The piston 3 thus penetrates into the cavity 40.

The cavity 40 is provided with a port 42 open into the internal duct 43 formed in the pipe 111 and inlet 5. This cavity 40 is bounded at the rear by its base portion 41 and is sealingly closed at the front by the piston 3.

The cavity 40 is defined by the tube 4 so as to reduce costs. The tube-guide 4 is fixed to a generally tubular body 2 which forms with the latter the part of the hydraulic declutching device which is known as the fixed part.

The body 2 is so configured as to be fixed on a fixed wall, which in this example is the front wall of the casing of the clutch or the casing of the gearbox of the vehicle.

For example, as described in the document FR-2 753 505, a soleplate is attached on the fixed wall of the vehicle, and mounting means of the bayonet type are interposed between the body 2 and the soleplate.

In this example, the body 2 has ears, which cannot be seen in FIG. 1, for fastening it with the aid of screws on the fixed wall of the vehicle, as described in the document FR-A-2 730 532 mentioned above.

In general terms, the body is mounted directly or indirectly on a fixed part of the vehicle.

The body is made of mouldable material, and is for example based on aluminium.

In this example the body 2 is of mouldable plastics material, and the inlet 5 is formed integrally by moulding with the body 2.

The body 2 surrounds the tube guide 4 which is mounted inside the body 2. The body 2 is therefore an external body with respect to the tube guide 4 which constitutes an internal tube. The body 2 and the tube 4 are mounted concentrically, having the same axis X—X of axial symmetry.

The tube guide 4 is longer in the axial direction than the body 2, and accordingly projects axially with respect to the body 2, which in this example has a stepped outside diameter so as to define an abutment shoulder 44 for the rear axial end of the preloading spring 48, the other end (i.e. the front end) of which bears on the rear face of a generally transversely oriented collar portion 210 which constitutes an increment to the thickness of the piston 3 at its free front end.

The front face of the collar portion acts as an abutment for the inner ring 12, and more precisely for an inner radial flange of the ring 12 formed at its inner periphery. An axially acting spring 110 holds the internal radial flange in contact with the collar portion 210. This spring 110 bears on a shoulder, not given a reference numeral, of the piston 3 at the front end of the latter. The ring 12, and therefore the bearing 1, are able to be displaced radially into contact with the collar portion 210 under the control of the spring 110, which in this example is a Belleville ring.

The clutch release bearing 1 therefore has a self-centring capability. In another version, the bearing is force-fitted on the piston 3 and is therefore not self-centring. In all cases, the bearing 1 is attached axially to the piston 3.

The preloading spring 48 surrounds the front end 204 of the body 2, having the smallest diameter, and the rear end 205 of the body 2, having a larger diameter, has ears for fastening it to the fixed wall of the vehicle. The input 5 is formed integrally with the rear end 205.

A protective bellows is provided. This bellows 15 is of elastomeric material such as rubber, and it surrounds the preloading spring 48 and has beads at each of its ends. The front ends of the bellows 15 and preloading spring 48 exert a small force on the diaphragm 100, and are disposed on either side of the outer periphery of the collar portion 210, which avoids engagement of the spring 48 on the bellows 15 and makes use of the bearing 1 for immobilising the front end of the bellows. The number of components is thereby reduced, because conventionally the spring 48 bears on the front end of the bellows 15 through a supplementary component.

It will be noted that the internal radial flange of FIG. 12 has two portions offset axially and radially with respect to each other, so as, respectively, to grip the front end of the bellows 15 in contact with the front face of the outer periphery of the collar portion 210, and to come into contact with the front face of the collar portion 210.

The piston 3 of tubular form, formed in plastics material by moulding, is guided in axial sliding movement along the outer periphery of the tube guide 4, which in this example is of metal, and more precisely along an inner tube 407 of the tube guide 4.

The piston 3 has at its inner periphery a sleeve 30. The sleeve 30 is fixed to the piston 3 and is in intimate contact on its inner periphery with the outer periphery of the tube 407.

The material of the sleeve 30, which in this example is a plastics material, is so selected as to have good sliding properties.

The piston 3 carries the actuating element 11 at its free front end, as mentioned above.

At its rear end the piston 3 carries a dynamic seal 31 which sealingly closes the blind cavity 40 and therefore the variable volume chamber defined by the piston 3 and the cavity 40. This seal 31 has lips and is fixed to the rear face of a connecting piece 32 of plastics material. This piece 32 has a front face in the form of a portion of a sphere for cooperation with the rear face of the piston, which is in the form of a portion of a sphere complementary to that of the piece 32. In another version, the said faces are frustoconical.

The piece 32 has at its outer periphery an axially oriented annular flange 132, which extends with a radial clearance above the rear end of the piston 3.

The flange 132 is formed with oblong holes into which there penetrate, with an axial clearance, projections 33 which project from the outer periphery of the piston 3. Thus, an axial and rolling movement is able to take place between the piston 3 and the connecting piece 32, which affords protection for the seal 31.

In this connection, the fingers of the diaphragm 100 are not all in the same plane, so that the clutch release bearing is able to oscillate. Because of these arrangements, in the clutch-engaged position the piston 3 is able to be displaced with respect to the seal 31.

Figure 21:
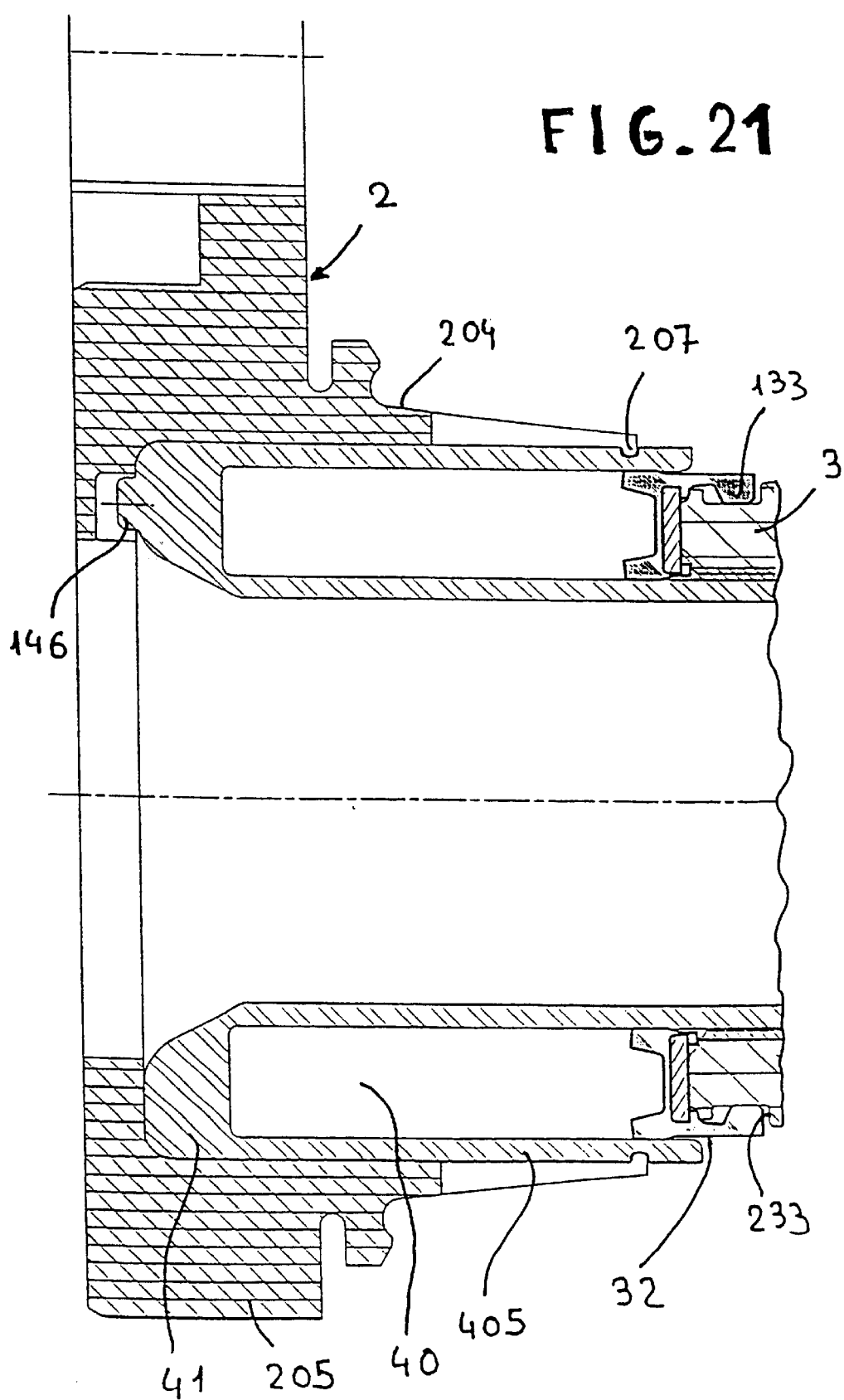
FIG. 21 is a view in partial axial cross section of the declutching device without the bellows, in a still further embodiment.

Accordingly, there is a facility for displacement between the seal 31, fixed to the piece 32, and the piston 3. In another version, FIG. 21, the structures are reversed, with the projections 133 being part of the piece 32 so as to penetrate with axial and radial clearances into a groove 233 in the piston.

The guiding inner tube 407 has at its front end a groove for receiving a circlip 45 which constitutes an axial abutment for the piston 3 and prevents escape of the seal 31 from the cavity 40. In addition, it enables an assembly which can be handled and transported to be created before being fitted on the vehicle, with the piston 3 being unable to escape under the action of the preloading spring 48.

The bellows 15 prevents contamination of the blind cavity 40 by pollutants.

The hydraulic control device according to the invention is inexpensive and light in weight. It enables the blind cavity 40 to be standardised, and the body 2 to be adapted to various vehicles. This solution enables the number of seals to be reduced.

This is due to the fact that the blind cavity 40 is made in the guide tube, or tube guide, 4.

This guide tube 4 is made in accordance with the invention by impact drawing with the aid of at least one punch and die, carrying a solid or hollow slug of malleable material.

In FIG. 1 this drawing process is carried out in two operations, namely (FIGS. 3A and 3C) a first operation of indirect impact drawing, and a second operation (FIGS. 4*a* to 4C) of deep drawing or direct impact drawing.

The tube 4 is formed from a solid slug 402, which in this example is made of aluminium.

The operations are carried out in the press, preferably cold, with the aid of a moving punch with a rounded end, and a fixed die.

During the first operation, the slug 402, which is circular, is converted into a cylindrical cup 403.

More precisely, the slug 402 is placed in a first die 401 which is hollow in the centre (FIG. 3A), and a first punch 401, the size of which is smaller than the recess in the die 401, is driven downwards to deform the slug 402 and so form a cup (FIG. 3B).

The punch 400 and the cup 403, which is of cylindrical form due to the annular space that exists between the cylindrical outer periphery of the punch 400 and the cylindrical lateral contour of the blind recess 404 in the die 401, are raised.

At the end of the first operation, the cup 403 therefore comprises an outer tube 405 and a base portion 406 which is thicker than the tube 405. The cup 403 is subsequently turned over.

During the second operation, the cup, having been turned over, is disposed in a fixed second die which comprises two concentric tubular parts 501, 502. These two parts 501, 502 define between them an annular space in which the outer tube 405 is lodged (FIG. 4A).

A tool 503 is present at the base of the die 501, 502 and is able to be displaced axially in a complementary manner in the internal bore 504 of the internal tubular part 502 of the die 501, 502, which is accordingly hollow in the centre.

A second punch 500 is also provided above the die 501, 502, and this die too can be displaced within the bore 504. An annular clearance is arranged between the outer periphery of the punch 500 and the contour of the bore 504.

Thus the punch 500, during its descent, is brought into contact with the base portion 406 of the cup, and it displaces the material of the base portion 406 so as to form an inner tube 407 connected to the outer tube 405 through an annular base portion 401 oriented transversely with respect to the axial axis of symmetry X—X of the hydraulic declutching device in accordance with the invention.

The punch 500 is then raised, and then the tool 503, which constitutes an ejector for extracting the tube-guide 4, is also raised, the tube guide 4 thus comprising an inner tube 407 surrounded by an outer tube 405 of shorter axial length than the inner tube 407, and an annular base portion 41 joining the tubes 405 and 407 together.

The base portion 41 is joined to the tubes 407 and 405 through rounded portions 408, 409 respectively.

These rounded portions 408, 409 are obtained due to the form of the upper end of the inner part 502 of the die 501, 502, and they enable the body 2 to hold the tube guide 4 satisfactorily.

By giving another form to the said upper end, another form, for example inclined, for the base portion could be obtained which would thus not necessarily extend transversely. It will be appreciated that the deformation of the slug 402, leading to flow of material and displacement of the material of the base portion 406, are easy to carry out when the slug 402 is of aluminium. It will be noted that the inner tube 407 guides the piston and constitutes the tube guide. The outer tube 405 guides the seal 31 and the piece 32 of the piston 3. It will be noted that, because of the impact drawing method, the faces of the tubes 405, 407 are very precise, and of good geometrical quality. More precisely, a very high degree of coaxiality is obtained in the tubes 405, 407 without any need for a repeat operation.

The blind cavity 40 is therefore defined only by the tube guide 4, which is of metal and of low thickness and has a robust form. Subsequently, a hole 42 is formed in the upper tube 405 so as to establish communication between the duct 43 and the cavity 40 for receiving the piston 3. The lips of this seal 31 cooperate with the outer periphery of the inner tube 407 and the inner periphery of the outer tube 405, which is shorter, respectively. The seal 31 wears uniformly because it is in contact with only one material. In addition, because of the impact drawing operation according to the invention, the inner periphery and the outer periphery, respectively, of the tubes 405, 407 are not rough and do no abrade the seal 31.

The piston 3 with its seal 31 and the connecting piece 32 are displaced sealingly because of the seal 31, within the cavity 40 which is fed under pressure through the port 42, which is located axially between the base portion 41 and the seal 31 when the clutch is engaged (FIG. 1).

The port 42, formed in the tube 405, is open into the minimum reserve volume of the variable volume chamber formed in the blind cavity 40 and delimited by the piston 3 which is movable axially with respect to the body 2 and the fixed guide tube.

After the above mentioned operations, an operation (FIG. 5) is of course carried out to size the guide tube 4 to length, this tube being concentric due to the presence of the tubes 405, 407 which are parallel to each other and concentric with the axis X—X.

This is carried out by means of tools 700, 701 which are displaced in the direction of the arrows in FIG. 5 and they trim to length, respectively, the outer tube 405 and the inner tube 407 which is longer than the tube 405. With the aid of a tool 702, the groove is formed for fitting the circlip 45 which constitutes an end stop for the front end of the piston 3.

In one embodiment, the plastics body 2 is formed by moulding on the tube guide 4. For this purpose, the tube 4 is provided with means for preventing rotation of the tube 4 with respect to the body 2, together with means for preventing any axial displacement of the tube 4 with respect to the body 2.

For example, in FIGS. 6 and 7, the outer tube 405 has at its front end notches 46. After the body 2 has been moulded into place, material 47 (FIGS. 10 and 11) of the body 2 penetrates locally into the notches 46 so as to prevent relative rotation of the tube 4 with respect to the body 2.

The material 147 of the body follows the form of the base portion 41 and comes into contact with the front face of the outer tube 405, so that the tube 4 is prevented from moving axially with respect to the body 2.

The same is true in FIGS. 12 and 13.

Relative blocking of the inner tube 4 against rotation with respect to the external body 2 is obtained with the aid of projecting elements, and in this example press-formed elements 146, made in the base portion (FIGS. 8 and 9).

After the applied moulding operation (FIGS. 12 and 13), the material 147 of the body 2 cloaks the press-formed elements 146 so as to prevent rotation. In general terms, the body 2 surrounds the outer tube 405 and therefore the guide tube 4. The body 2 is mounted concentrically with respect to the tubes 405, 407, and has a base portion through which the shaft 101 passes and which serves as an abutment for the base portion 41. It will be appreciated that the notches 46 and the press-formed elements 146 are easily formed during the above mentioned impact drawing operations. Thus, in one embodiment, the first punch 400 has projecting elements of complementary form to the form of the notches 46. The position of the projecting elements on the punch 400 depends on the application, and in particular on the length of the outer tube 405. In FIG. 3B, the notches 46 are formed in this way.

It is easy to form the press-formed elements 146 using the die part 502. For this purpose it is sufficient to provide projecting elements at the upper end of the part 502, in order to form, with the aid of the second punch 500, the elements 146 which in this example are in the form of cylindrical pips.

Thanks to the invention, the notches 46 and the press-formed elements 146 may have the desired form by giving the first punch 400 and the part 502 projections of appropriate forms.

In the foregoing FIGURES, the tubes 405, 407 and the base portion 41 have the same thickness, but this is not necessarily true.

For example, as shown in FIG. 4B, by adjusting the outer diameter of the second punch 500, it is possible to obtain an inner tube 407 which is thicker than the outer tube 405.

Figure 20:
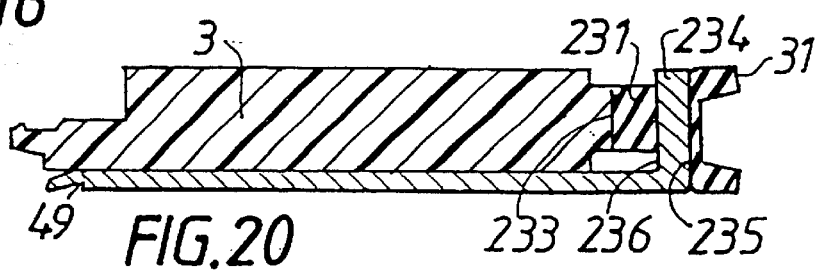
FIG. 20 is a view similar to FIG. 19 for yet another embodiment.

With the aid, in particular, of the part 502 of the die 501, 502, and by selection of the thickness of the base portion 406 of the cup 403, it is possible to obtain a tube guide 4 having a base portion 41 the thickness of which is greater than that of the tubes 405, 407, as can be seen in FIG. 20.

Thanks to the invention, by adjusting the axis displacements of the punches 400, 500 it is possible to control the axial length of the tubes 405, 407.

The impact drawing operation thus enables numerous possibilities to be obtained.

In the embodiment of FIG. 1 the outer tube 405 has at its front end a radial annular flange 48 which is of divided form and which extends outwards away from the axis X—X, for cooperation with the front face of the body 2.

The tube 4 is prevented from rotating with respect to the body 2 by means of lugs 207 projecting from the inner periphery of the front end 204 of the body 2, the said lugs 207 penetrating into recesses 208 formed in the front end of the outer tube 405. The outer tube therefore has recesses for preventing it from rotating with respect to the body. In another version, these recesses are replaced by projecting elements.

The tube 4 can be snap-fitted in the body 2 due to the fact that the front end 204 of the body is of low thickness.

Thus, the tube 4 is inserted axially into the body until the lugs 207 fall into the recesses 208. The tube 4 is then blocked by the flange 48 of the tube 405 and by the base of the body 2 cooperating with the base of the tube 4. Such an arrangement can also be seen in FIG. 21, in which the front end 204 of the body 2 has, in axial slots, radially elastically deformable fingers which have the lugs 207.

In FIG. 1, the inlet 5 is integral with the body 2.

In FIGS. 10 to 15, the inlet 50 is attached on the body 2 by clipping at 52, or, in other versions, by adhesive bonding, by friction, bayonet mounting, screw fastening, clipping or ultrasonic welding, or by indirect application of heat such as by laser welding.

It will be noted that in FIGS. 10, 12, 14 and 15, one of the ears for fastening the body 2 to the fixed part of the vehicle can be seen at 58. The ears 58 are integral with the body 2.

In FIGS. 10 to 12, a single seal 51 is necessary because the inlet 50 is in contact with the outer tube 405.

In FIGS. 14 and 15 it is necessary to provide a first seal 56 between the inlet 50 and the body 2, and a second seal between the body 2 and the outer tube 405, because the inlet 50 is mounted on the body 2.

The first seal 56 consists for example of an O-ring seal.

In FIG. 14, the second seal consists of two O-ring seals 57, disposed on either side of the feed port 42 of the annular blind cavity 40.

In FIG. 15 the seal consists of a band of rubber which is perforated in the region of the port.

As will be understood, the tube 4 can be standardised. This tube includes an outer tube 405 extending parallel to the inner tube 407, as described above.

Figure 16:
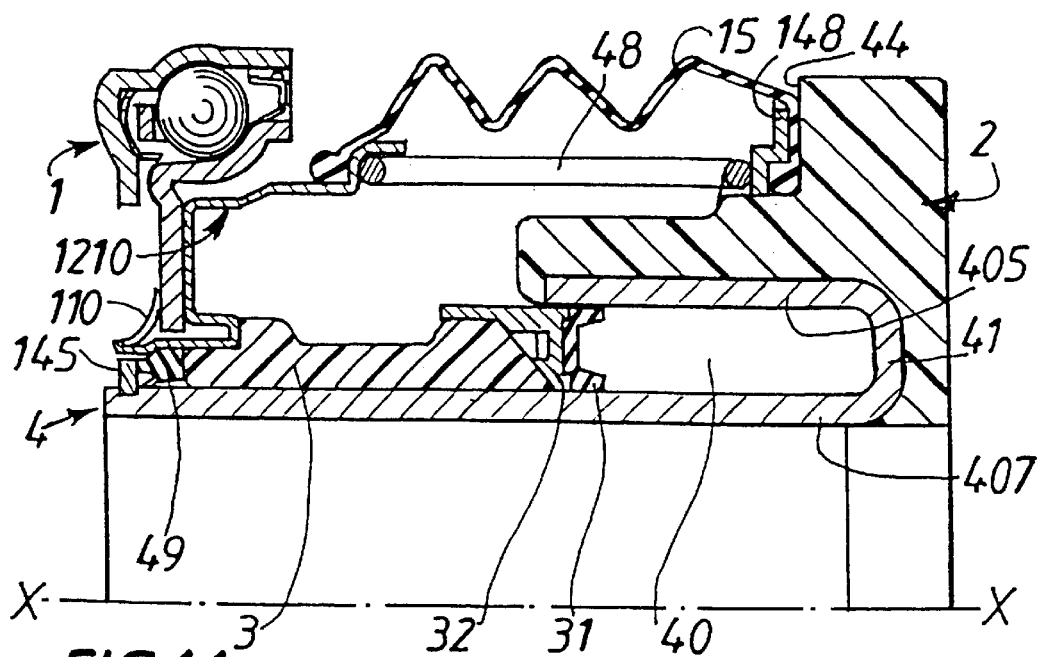
FIG. 16 is a half view in axial cross section of a declutching device in yet another embodiment.

Thus in FIG. 16, the tube is identical with that in FIGS. 8 and 9 or 6 and 7.

The body 2 is a function of the application, and the same is true of the piston 3 and the clutch release bearing 1.

In FIG. 16 the piston 3 carries a collar piece 1210.

This collar piece is attached on the front end of the piston 3 by applied moulding or snap-fitting.

The collar piece 1210 is for example of sheet metal with bends, because the collar piece 1210 carries the axially acting resilient ring 110—a Belleville ring in the present case—and the front end of the bellows 15. The collar piece 1210 serves for abutment at the front end of the preloading spring, the front ends of the bellows 15 and spring 48 being disposed on either side of a transverse shoulder of the collar piece 1210, which is so configured as to retain the front end of the spring 48.

The rear end of the spring 48 is in engagement against an intermediate pressure piece 148 for trapping the rear bead of the bellows 15 between the said piece 148 and the shoulder 44 of the body 2.

A lip seal 49 is lodged in a cavity which is bounded by a tubular portion of the collar piece 1210 and by the front end of the piston 3. The seal 49, in particular, prevents any oil leaks from reaching the friction liners of the clutch.

The end stop consists of a split ring 145 in place of the seal 45 of FIG. 1.

The seal 31 is secured by injection moulding to the connecting piece 32, so that it has spigots extending across the piece 32 and having a head on the other side of the piece 32.

There is a radial clearance, as in FIG. 1, between the outer periphery 132 of the piece 32 and the outer periphery of the piston 3, so as to enable the piston 3 to perform rotation in three dimensions with respect to the piece 32.

For more detail, in particular as regards the collar piece 1210, reference should be made to Application No. FR 97/15834 filed on Nov. 12, 1997, which describes all of these arrangements.

The connecting piece 32 of FIGS. 1 and 16 is relatively thick, because the seal 31 is fixed in the piece 32 by means of injection moulded spigots.

In order to reduce the axial size of the assembly consisting of the connecting piece 32 and the seal 31, it is proposed (FIG. 17) to join the seal 31 to the connecting piece 32 of plastics material by means of an injection moulding operation using two materials, of the kind also called co-moulding.

Figures 17, 18:
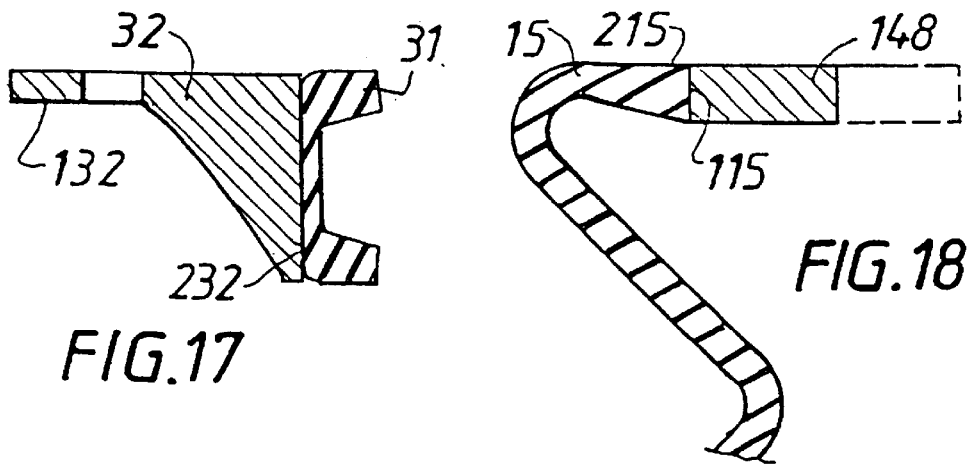
FIG. 17 is a view in axial cross section of the connecting piece equipped with the sealing ring which seals the blind cavity.
FIG. 18 is a view in axial cross section of the protective bellows equipped with a pressure member, which is part of the bellows of the declutching device.

In FIG. 17 the connecting surface 232 between the seal 31 and the connecting piece 32 consists of the rear face of the piece 32.

The thickness of the piece 32 can thus be reduced, especially at its inner periphery, because no spigot of the lip seal 31 passes through the piece 32. This enables the piston guide surface to be increased, and/or the axial size of the hydraulic control declutching device according to the invention to be reduced.

It is of course possible to fix the pressure member 148 of plastics material in FIG. 16 by twin-material injection moulding, or comoulding, to the rear end of the bellows 15, as can be seen in FIG. 18.

In another version the bellows 15 is secured to the body 2 of plastics material by co-moulding or injection moulding with two materials.

As can be seen in FIG. 18, the connecting surface 115 consists of the inner face of a thickened portion 215 which constitutes the rear end of the bellows 15. The member 148 is simplified because it is flat, by contrast to that in FIG. 16.

This enables the axial size to be reduced and the formation of the bead at the end of the bellows to be avoided, so that fitting of the bellows is simplified.

It is of course possible to configure the front end of the bellows 15 in a similar way to the rear end. In that case, the front end of the spring 48 bears on the pressure piece.

Figure 19:
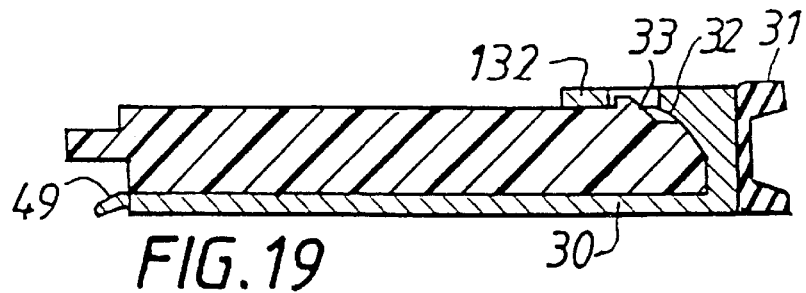
FIG. 19 is a view, in axial cross section, of the piston of the declutching device in a further embodiment.

It is of course possible to secure the lip seal 49, by co-moulding, or injection moulding of two materials, on the sleeve 30 of the piston 3 as can be seen in FIG. 19. The sleeve 30, of plastics material, is fixed to the piston. The lip seal 49 is thus simplified, and is less expensive because it uses less material and is smaller in the axial direction. This enables the axial size to be reduced and/or the length over which the piston is guided to be increased.

The piston can of course be mounted for axial movement with respect to the plastics sleeve 30.

The sleeve 30 thus has at its rear end an axially oriented annular plate element 234 (FIG. 20).

It is on the rear surface 235 of this plate element 234 that the seal 31 is fixed by injection moulding of two materials.

A block of elastic material 231, which in this example is an elastomer such as rubber, is fixed by twin-material injection moulding on the front face 236 of the plate element 234 and on the rear face 233 of the piston 3, which is thus able to be displaced axially with respect to the sleeve 30 and seal 31 when the clutch is engaged under the effect of the rotation of the diaphragm 100, the fingers of which are not all in the same plane, so that the actuating element 11, the release bearing 1 and the piston 3 are therefore enables to be displaced axially, and more precisely to vibrate axially. The block 231 then damps out the vibrations.

This arrangement enables the connecting piece 32 of FIGS. 1 or 19 to be omitted, and permits replacement of the latter by the plate element 234 which is simpler and cheaper. Transmission of vibrations to the seal 31 is even more limited.

Figure 2:
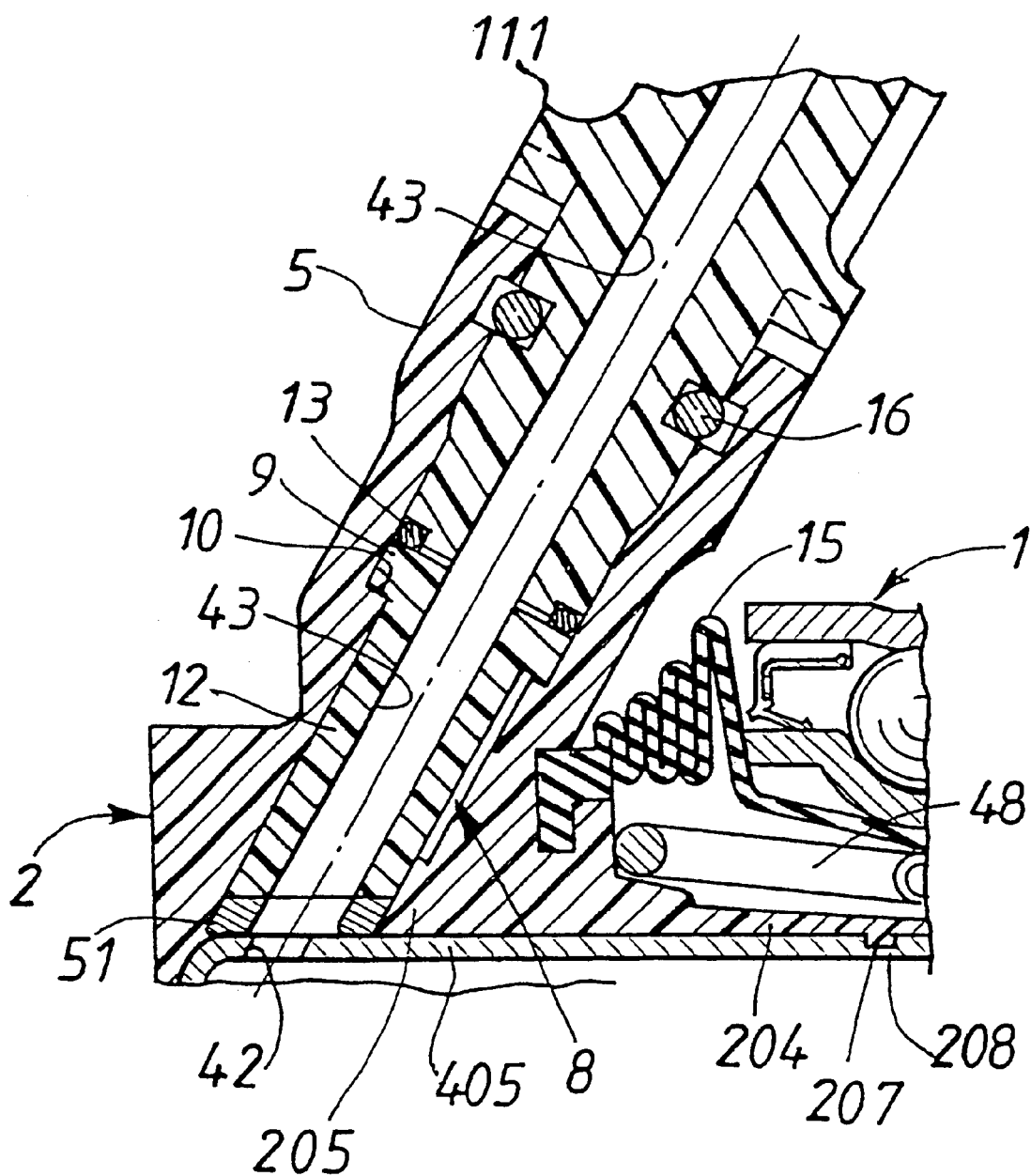
FIG. 2 is a partial view on a larger scale than FIG. 1, showing the input side of the declutching device.

In FIG. 2, it is possible to secure the seal 51 by injection moulding of two materials on a shouldered tube 12 of plastics material which is mounted on the inlet 5, which is stepped in diameter internally so as to form a shoulder 10, the head 9, of larger diameter of the tube 12, being above the shoulder 10.

The tube 12 has an axial projection or key which is engaged in an axial groove of smaller diameter in the tube 12. Thus, rotational stop means 8 are arranged between the tube 12 fixed to the seal 51, and the inlet 5.

The tube 12 extends the pipe 111, the duct 43 being formed in the internal bores of the pipe 111 and tube 12.

An O-ring seal 13 is provided between the end of the pipe 111 and the head 10 of the tube 12, which is held in place by the elastic spring clip 16 engaged in a groove formed in the outer periphery of the pipe and in two passages formed in the inner periphery of the inlet 5 in facing relationship with the groove.

In the foregoing (FIGS. 17 to 20), the seals 51, 31, 49, the bellows 15 or the block 231 are of course in resilient material—in the present case an elastomer such as rubber—which is compatible with the plastics material of the components 12, 32, 30, 2, 148, 3 on which the seals, the bellows or the block are fixed.

Thus, for example in FIG. 20, the plastics material of the sleeve 30 must be compatible with that of the seals 31, 49 and block 231, while the plastics material of the piston 3 is compatible with that of the block 231, which acts as a damper.

The injection moulding process with two materials is carried out for example by hot moulding in two steps.

In a first step, the plastics material of the component concerned is injected into the mould, and then, before cooling, the elastomer of the resilient component concerned is injected into the same mould, in particular in the region of the connecting surface with adhesion of the resilient material on the plastics material.

For example, in FIG. 17 the material of the connecting piece 32 is injected into the mould, and then, before the piece 32 is cooled, the elastomer of the seal 31 is injected into the mould into contact with the connecting surface 232.

The advantage of injection moulding using two materials for the hydraulic declutching device lies in particular in simplification of components, reduction in axial size and increase in the length over which the piston is guided. This makes assembly easier.

In addition, there is no need for any additive agent to produce adhesion of the elastomer of the component 51, 49, 31, 231, 15 of plastics material on the component 12, 30, 32, 3, 149, 2 of elastic material. Good cohesion is obtained. The danger of rupture is reduced.

In addition, improved compatibility with the control fluids is obtained.

For example, the conventional adhesive agent is a glue.

The glue is omitted because of the use of injection moulding in two materials, and this reduces bulk.

In addition, there is no need to control the thickness of the glue, which is important for the joint; too great a thickness of glue makes the joint fragile. Preferably the elastic material, the elastomer, is a sealant. Thus the seal 31 and the material 231 are preferably sealants and in another version, instead of injecting the plastics material into the mould, the plastics material is placed when already injected into the mould, and then the elastomer of the elastic material concerned is injected into the mould before the plastics material is cooled. In another version, instead of injecting the elastomer of the plastics component concerned into the mould, a slab of elastomer is placed in the mould of the component concerned, above the plastics component, so that the slab is then vulcanised by compression in the mould.

Instead of using twin-material injection moulding, it is of course possible to use adhesive bonding.

The embodiment in FIGS. 16 to 17, and 19 and 20 is applicable to any type of cavity 40 whatever, for example the one described in the document FR-A-2 730 532, but nevertheless, thanks to the cavity 40 obtained by impact drawing, very good results are obtained, with the piston 3 of FIGS. 19 and 20 being displaced under good conditions, in particular due to the accuracy with which the tubes 405 and 407 are coaxial.

It will be appreciated that the declutching device according to the invention is light in weight, because the body 2 is preferably of plastics material.

In addition, the cavity 40 is hardly sensitive to variations in pressure which are produced within it during the clutch engaging and declutching operations.

In the foregoing embodiments, the impact drawing process is carried out in two operations with the aid of solid punches 400, 500 penetrating within hollow dies.

In another version, FIGS. 22A to 22C, the slug 1402 has a hole in the centre, while the punch 1400 is hollow in the centre and penetrates into the die 1401 which has a central cylindrical portion 1500 with a T-shaped cross section. The cylindrical portion is caused to penetrate into the punch 1400. The die thus has a concentric external portion 1501 with an internal bore 1404, and a central portion 1500 which is surrounded by the external portion 1501. The central hole in the slug 1402 depends on the dimension of the central portion. Thus, in FIG. 22A, the slug 1402 is fitted over the cylinder of the central portion 1500 until the slug 1402 comes into engagement on the base of the central portion 1500. The slug is then interposed between the cylindrical external portion 1501 and the central portion. The punch 1400 is then forced down so as to deform the slug 1402 and form the cavity 40 (FIG. 22B) by drawing the material, under the impact from the punch, along the die as in the other methods. The punch 1400 is then raised with the guide tube 4 (FIG. 22C).

Using this tooling, the impact drawing is carried out in a single operation without the guide tube being turned over. The outer tube 405 is then cut so as to give it the desired length. By adjusting the size of the punch 1400, especially as regards the diameter of its internal bore, an inner tube 407 of greater thickness than the outer tube 405, and vice versa, can be obtained. The form of the base of the central portion 1500 enables the base portion 41 to be given the desired form. For example, with a frusto-conical base, an inclined base portion 41 is obtained.

In the foregoing FIGURES, the external body is distinct from the guide tube, but in FIG. 24 the guide tube 4 is integral with the external body and includes means 158 for fastening it to the fixed part of the vehicle. These means consist of a collar portion which projects radially outwards. The collar portion 158 extends the base portion 41 radially outwardly, and is thicker than the latter, which is itself thicker than the outer tube 405 and inner tube 407.

The collar portion 158 has axial holes 159 for passage through them of members for fastening it to the fixed part of the vehicle, which in this example is the casing 2000 of the gearbox (FIG. 24).

The fastening members are usually in the form of screws, the holes 159 being spaced apart at regular intervals.

The collar portion 158 thus enables the tube 4 to be fixed directly on the casing 2000.

The collar portion 158 also has a radial hole 143 which is open in the base of the cavity 40 for feeding the latter. This hole 143 replaces the duct 43 of FIG. 1, so that the seal 51 in that Figure is omitted.

An end piece can be fitted on the collar portion for mounting the pipe 111 of FIG. 1. The hole 143 can of course be threaded for screw fastening of the pipe. This hole may be inclined. It all depends on the application. The collar portion is obtained as can be seen in FIGS. 23A to 23C, with the aid of a hollow second punch 1600 surrounding the punch 1400, which is itself arranged to surround the central portion 1500, with the internal bore 404 of the external part serving to guide the outer periphery of the second punch 1600. The method continues as in FIGS. 22A and 22B, with the two punches 1400, 1600 deforming the material of the slug 1402, which flows between the two punches 1400, 1600 so as to form the outer tube 405. As in FIGS. 22A and 22B, the material flows between the central portion 1500 and the first punch 1400 so as to form the inner tube 1405. At the end of the operation, the two punches are raised. In all cases, the internal bore of the first punch 1400 has a diameter greater than the outer diameter of the central portion 1500. In FIGS. 22A and 22B, the material flows between the punch 1400 and the outer portion so as to form the outer tube.

In FIGS. 22A to 23C, the outer tube 405 and the inner tube are of the same length, so that it is necessary to carry out a repeat operation in order to cut the outer tube 405 to the desired length as in FIG. 5.

The end of the punch 1600 can be notched in order to vary the thickness of the collar portion 158.

The base of the central portion 1500 may be provided with projections so that the collar portion can have a variable thickness, in order that it can adapt to the contour of the gearbox.

It is of course possible to mould the external body on the collar portion 158, so that the external body does not necessarily follow the form of the outer tube 405.

The collar portion 158 may undergo a repeat operation and may include projecting portions which are separated by slots, to give a mounting of the bayonet type for fitting the collar portion on a soleplate, in the manner described in the document FR-A-2 753 505.

What is claimed is:

1. A hydraulically controlled declutching device (100) for a clutch for a motor vehicle, comprising a body (2) for fastening the declutching device on a fixed part, a metallic guide tube (4) fixed to the body (2) and arranged for a shaft (101) to pass through it, an axially oriented annular blind cavity (40) formed in an assembly that consists of the body (2) and the guide tube (4), for receiving a control fluid, a piston (3) which firstly penetrates into the blind cavity (40) so as to define a variable volume control chamber, and which, secondly, is mounted for axial sliding movement along the guide tube (4), and an actuating element (11) carried by the piston (3) for acting on the declutching device (100) of the clutch, wherein the blind cavity (40) is formed in the guide tube (4) and has an inner tube (407) for guiding the piston (3), the inner tube being surrounded by a concentric outer tube (405), together with a base portion (41) which joins together the inner tube (407) and the outer tube (405), characterised in that the guide tube (4) is formed by impact drawing from a metal slug (402, 1402).

2. A device according to claim 1, characterised in that the slug (402, 1402) is of an aluminium based material.

3. A device according to claim 1, characterised in that the outer tube (405) has a fluid feed port (42) in the vicinity of its base portion (41).

4. A device according to claim 1, characterised in that the base portion (41) is oriented transversely and is joined to the inner tube (407) and outer tube (405) by respective rounded portions (408, 409).

5. A device according to claim 1, characterised in that the base portion (41) is thicker than the inner tube (407) and outer tube (405).

6. A device according to claim 1, characterised in that the body (2) is integral with the guide tube (4), which has radially projecting means for fastening it to the fixed part.

7. A device according to claim 1, characterised in that the body (2) is separate from the guide tube (4) and follows the form of the base portion (41) of the guide tube.

8. A device according to claim 1, characterised in that the body (2) is separate from the guide tube (4) and follows the form of the outer tube (405).

9. A device according to claim 8, characterised in that the external body (6) is formed by moulding on the guide tube.

10. A device according to claim 8, characterised in that the external body (6) is snap-fitted on the guide tube (4).

11. A device according to claim 8, characterised in that the guide tube (4) has recesses or projecting elements cooperating with the body (2) for preventing rotation of the guide tube (4) with respect to the body (2).

12. A device according to claim 11, characterised in that projecting elements, consisting of press-formed elements (146), are formed in the base portion (41) of the guide tube (4).

13. A device according to claim 12, characterised in that the recesses consist of notches (46) formed in the outer tube (405).

14. A method of making a guide tube (4) according to claim 1, characterised in that, starting with a solid metal slug (402), the latter is placed in a recess (404) in a first die (401), and then with the aid of a first punch (400), the slug (402) is deformed so as to form a cylindrical cup (403) bounded by an outer tube (405).

15. A method according to claim 14, characterised in that, after formation of the cup (403), the punch (400) is raised and the cup is placed in a second die (501, 502) which is hollow in the centre and defines an annular space for receiving the outer tube (405) of the cup (403).

16. A method according to claim 15, characterised in that, with the aid of a second punch (500), the base portion (406) of the cup (403) is press-formed, with the said punch penetrating into the interior of the die so as to form an inner tube (407).

17. A method according to claim 16, characterised in that the second punch (500) is raised, and the guide tube (4) is then ejected with the aid of an ejector penetrating into the central bore of the second die (501, 502).

18. A method of making a guide tube according to claim 1, characterised in that, starting with a slug (1402) with a central hole, the latter is disposed in a recess (1402) of an external portion (1501) of a die which has a central portion (1500) over which the slug (1402) is fitted, and then, with the aid of a hollow punch (1400) having an internal bore with a diameter greater than that of the central portion (1500), the slug (1402) is deformed so as to form the guide tube (4).

19. A method according to claim 18, characterised in that, after formation of the guide tube (4), the punch (1400) is raised.

20. A method according to claim 19, characterised in that, with the aid of a second punch (1600), guided externally by the external portion of the external portion (1501) of the die and surrounding the first punch (1400), the slug is deformed locally so as to form a collar portion on the guide tube (4).

* * * * *